Patented May 8, 1951

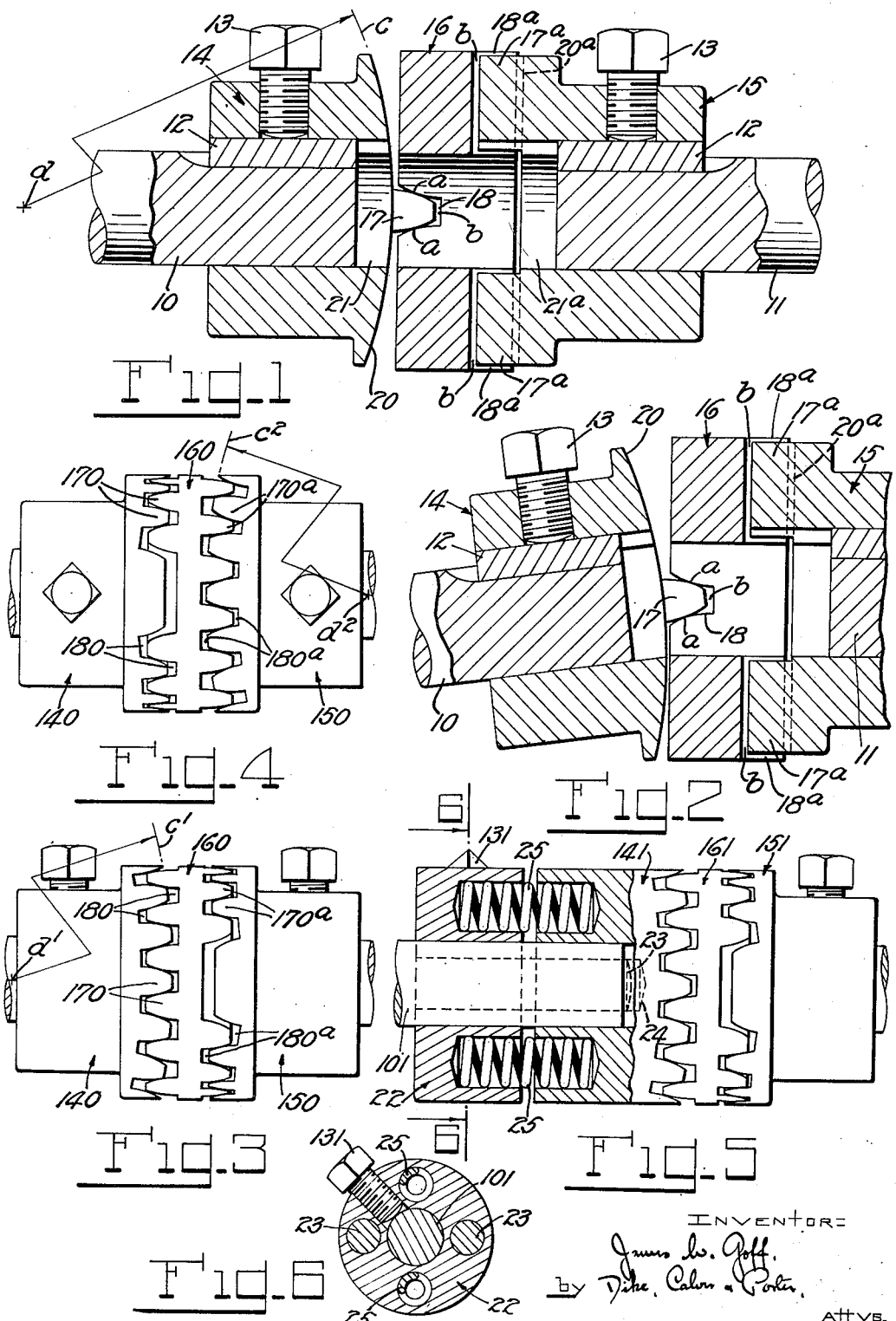
May 8, 1951     J. W. GOFF     2,551,735
SHAFT COUPLING
Filed April 25, 1945

2,551,735

UNITED STATES PATENT OFFICE 2,551,735

SHAFT COUPLING

James W. Goff, Taunton, Mass., assignor to Industrial Machine Works, Inc., South Hanson, Mass., a corporation of Massachusetts Application April 25, 1945, Serial No. 590,262

6 Claims. (Cl. 64—31)

This invention relates particularly, although not exclusively, to shaft couplings for use in connection with means for rotating, adjusting, and controlling the angular positions of parts of such apparatus as submarine detecting devices, radio antennae (radar), etc. A shaft coupling suitable for use in such relationship must fulfill certain essential requirements, namely: it must permit of considerable variation in the axial alinement (both lateral and angular) of the shafts connected; it must be silent in its operation; and it must be free of all possibility of lost motion or backlash, whether initial or as the result of wear, not only to prevent noise, but also to insure the accuracy of the angular positioning of the parts controlled. So far as I am aware, no shaft coupling heretofore devised has been capable of satisfactorily meeting all of these requirements. In accordance with my invention there is provided a coupling which permits a wide variation, both lateral and angular (particularly the latter) in the shaft axes; which is noiseless in its operation; and which can be maintained entirely free of lost motion or backlash.

The invention will best be understood from the following description of certain forms or embodiments thereof illustrated in the accompanying drawings, these, however, having been chosen for purposes of exemplification merely, as it is contemplated that the invention, as defined by the claims hereunto appended, may be otherwise embodied without departure from the spirit and scope thereof.

In said drawings:

Fig. 1 is a longitudinal section of a coupling embodying a simple form of the invention, showing the shaft axes in substantial alinement.

Fig. 2 is a similar view showing the shaft axes angularly disposed.

Figs. 3 and 4 are elevations, as viewed from directions at right angles to one another, of a modified construction.

Fig. 5 is an elevation, partly in longitudinal section, of a further modification.

Fig. 6 is a cross section taken substantially on the line 6—6, Fig. 5.

Referring to Figs. 1 and 2, two shafts to be coupled are indicated at 10 and 11. Secured to the adjacent ends of the shafts 10 and 11, respectively, as by keys 12 and set screws 13, are heads or end members 14 and 15. Interposed between the end members 14 and 15 is a floating intermediate member 16. The end and intermediate members are formed with interengaging ribs and grooves 17, 18, 17a, 18a of which those at the opposite sides of the intermediate member, respectively, are disposed transverse (preferably at right angles) to one another; that is to say, the ribs 17 and grooves 18 connecting the intermediate member with the end member 14 are substantially perpendicular to the ribs 17a and grooves 18a connecting said intermediate member with the end member 15.

As thus far described, the coupling is of the well-known Oldham type, which permits lateral offsetting of the shaft axes while maintaining the driving connection, but, in accordance with the present invention, the ribs 17, 17a and grooves 18, 18a are in the form, or have the profiles, of intermeshing (preferably involute) gear teeth having rolling contact with engaging surfaces only at their lateral faces, as indicated at $a$, and clearances, indicated at $b$, between the outer ends of the ribs and the bottoms of the grooves. Also, in accordance with the invention, the intermediate member 16 is composed of a sintered pulverized bearing metal, commonly used in bearing bushings and the like, providing an element capable of absorbing and retaining a considerable quantity of fluid lubricant. Further, in accordance with the invention, the faces of the end members 14 and 15 are of substantially cylindrical form, that is to say, are curved about axes parallel respectively to the ribs and grooves at the corresponding side of the intermediate member 16 and consequently transverse to one another, so that the curvatures of the faces of the respective members are in transverse planes. Thus, as shown in Fig. 1, the face 20 of the end member 14 lies in a cylindrical surface $c$ whose axis of curvature $d$ is parallel to the rib 17 and groove 18, and it will be understood that the face 20a, of the member 15 is similarly curved about an axis parallel to the rib 17a and groove 18a.

By forming the interengaging ribs and grooves in the shape of intermeshing, rolling contact gear teeth, as described, several important advantages are achieved. Since the engagement of the parts is only along their lateral faces $a$, with clearances $b$ at the bases, any tendency to lost motion or blacklash can, at any time, be taken up and eliminated by loosening one of the set screws 13 and axially adjusting the corresponding end member in the direction toward the intermediate member and other end member. The rolling contact gear tooth formation, in connection with the relatively transversely curved formation of the end member faces 20 and 20a about axes parallel to the ribs 17 and 17a, respectively, permits a considerable angular variation of the shaft axes without looseness or noise, the parts merely rolling upon one another in the manner of intermeshing gears, this action being substantially contributed to by the self-lubricating character of the intermediate member 16.

As shown in Figs. 1 and 2, each end member is formed with a single rib 17, 17a (although each of these comprises two alined sections separated by an axial bore 21, 21a) each cooperating with (in substance) a single groove 18, 18a in the intermediate member. While such a construction illustrates the major features of the invention, and is suitable for use in certain situations, the preferred construction shown in Figs. 3 and 4 utilizes the rolling gear principle to a more complete extent, provides for a somewhat wider variation in the angular position of the shaft axis, and also affords a firmer and more positive connection of the parts in all positions. As shown in Figs. 3 and 4, each of the end members 140, 150 (which may be secured to their respective shaft sections as in Figs. 1 and 2) is connected with the intermediate member 160 by a plurality of parallel interengaging ribs 170, 170a and grooves 180, 180a all in the form of rolling contact, intermeshing gear teeth substantially as above described in connection with the gear tooth ribs and grooves 17, 18, 17a, 18a. One set of ribs at each side of the intermediate member 160 terminates in a curved surface having an axis of curvature parallel to the corresponding ribs. Thus, by comparing Figs. 3 and 4, it will be seen that the ribs 170 on the end member 140 terminate in a cylindrical surface $c'$ whose axis $d'$ is parallel to said ribs 170, while the ribs 170a on the end member 150 terminate in a cylindrical surface $c^2$ whose axis $d^2$ is parallel to said ribs 170a and consequently transverse to the axis $d'$.

As above explained in connection with Figs. 1 and 2, any looseness or backlash which may develop as the result of wear of the gear tooth surfaces can be taken up by axial adjustment of one or the other or both of the end members. In Figs. 5 and 6 is shown a construction wherein any incipient looseness due to wear is immediately and automatically taken up, and thereby prevented, without attention on the part of the operator. In Figs. 5 and 6, the end members 141 and 151 and intermediate member 161 are substantially identical with the corresponding members in Figs. 3 and 4, except that the end member 141 is not fixed to its shaft section 101, but is mounted thereon with a sliding fit. Fixed to the shaft section 101, as by a set screw 131, is a collar 22 carrying longitudinally extending guide pins 23 which are received in openings 24 in the end member 141 and thereby hold said end member against rotation with respect to the shaft while guiding the same for axial movement thereon. Interposed between the collar 22 and end member 141 are springs 25 having their ends housed in suitable sockets formed in said parts. The springs 25 act at all times to yieldingly urge the end member 141 axially toward the intermediate member 161 and end member 151, thereby maintaining the several sets of cooperating gear tooth ribs and grooves in close engagement at all times.

It will be observed that a coupling in accordance with the invention can be produced at very low cost as compared to its quality of operation and advantageous results, since the intermediate members can be readily produced, in quantities, in a suitably designed die, while the parallel gear tooth ribs and grooves on the end members can be formed by a simple broaching operation.

I claim:

1. A shaft coupling comprising heads or end members for attachment to the adjacent ends of the shaft sections to be coupled and an interposed intermediate member, said end and intermediate members having interengaging ribs and grooves of which those at the opposite side of the intermediate member, respectively, are disposed transverse to one another, said ribs and grooves being in the form of gear teeth having rolling contact with engaging surfaces only at their lateral faces and clearances between the outer ends of the ribs and the bottoms of the grooves.

2. A shaft coupling comprising heads or end members for attachment to the adjacent ends of the shaft sections to be coupled and an interposed intermediate member, said end and intermediate members having, on each side of said intermediate member, a plurality of parallel interengaging ribs and grooves of which those at the opposite sides of the intermediate member, respectively, are disposed transverse to one another, said ribs and grooves being in the form of gear teeth having rolling contact with engaging surfaces only at their lateral faces and clearances between the outer ends of the ribs and the bottoms of the grooves.

3. A shaft coupling comprising heads or end members for attachment to the adjacent ends of the shaft sections to be coupled and an interposed intermediate member composed of a sintered pulverized bearing metal, said end and intermediate members having, on each side of said intermediate member, a plurality of interengaging ribs and grooves of which those at the opposite side of the intermediate member, respectively, are disposed transverse to one another, said ribs and grooves being in the form of gear teeth having rolling contact with engaging surfaces only at their lateral faces and clearances between the outer ends of the ribs and the bottoms of the grooves.

4. A shaft coupling comprising heads or end members for attachment to the adjacent ends of the shaft sections to be coupled and an interposed intermediate member, said end and intermediate members having interengaging ribs and grooves of which those at the opposite side of the intermediate member, respectively, are disposed transverse to one another, said ribs and grooves being in the form of gear teeth having rolling contact with engaging surfaces only at their lateral faces and clearances between the outer ends of the ribs and the bottoms of the grooves, the adjacent faces of the intermediate member and the respective end members being relatively curved respectively about axes disposed transverse to one another.

5. A shaft coupling comprising heads or end members for attachment to the adjacent ends of the shaft sections to be coupled and an interposed intermediate member, said end and intermediate members having interengaging ribs and grooves of which those at the opposite side of the intermediate member, respectively, are disposed transverse to one another, said ribs and grooves being in the form of gear teeth having rolling contact with engaging surfaces only at their lateral faces and clearances between the outer ends of the ribs and the bottoms of the grooves, the adjacent faces of the intermediate member and the respective end members being relatively curved about axes parallel to the ribs and grooves thereon, respectively.

6. A shaft coupling comprising heads or end members for attachment to the adjacent ends of the shaft sections to be coupled and an interposed intermediate member, said end and intermediate members having on each side of said intermediate member, a plurality of parallel interengaging ribs and grooves of which those at the opposite sides of the intermediate member, respectively, are disposed transverse to one another, said ribs and grooves being in the form of gear teeth having rolling contact with engaging surfaces only at their lateral faces and clearances between the outer ends of the ribs and the bottoms of the grooves, and one set of ribs at each side of said intermediate member terminating in a curved surface having an axis of curvature parallel to said ribs.

JAMES W. GOFF.

REFERENCES CITED

The following references are of record in the file of this patent:

UNITED STATES PATENTS

| Number | Name | Date |
|---|---|---|
| 481,780 | Brown | Aug. 30, 1892 |
| 1,244,533 | Morse | Oct. 30, 1917 |
| 1,407,445 | Spangler | Feb. 21, 1922 |
| 1,702,407 | Lyman | Feb. 19, 1929 |
| 2,011,147 | Haselau | Aug. 13, 1935 |